E. JARRELL.
Plow-Colter.
No. 206,334. Patented July 23, 1878.
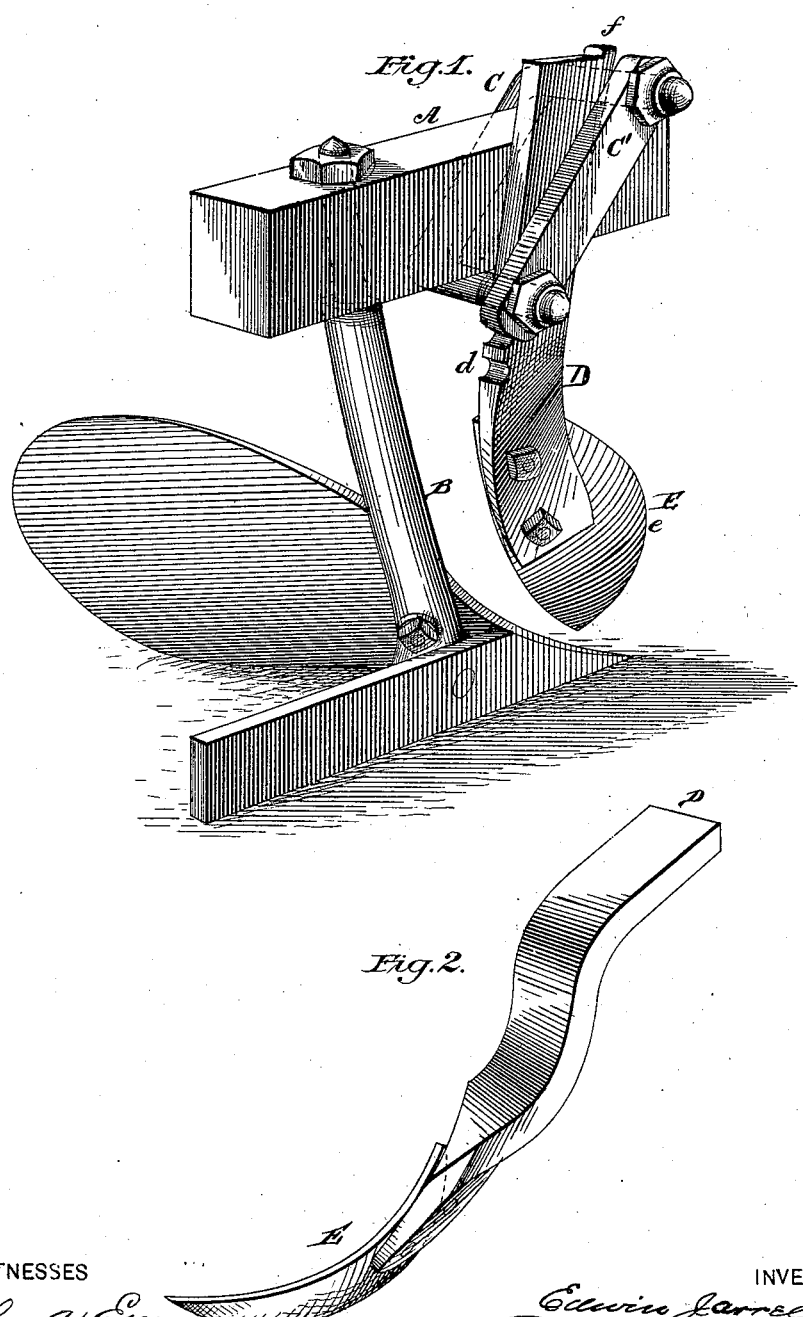

UNITED STATES PATENT OFFICE.

EDWIN JARRELL, OF THORNTOWN, INDIANA, ASSIGNOR OF ONE-HALF HIS RIGHT TO JAMES T. McKIM, OF SAME PLACE.

IMPROVEMENT IN PLOW-COLTERS.

Specification forming part of Letters Patent No. 206,334, dated July 23, 1878; application filed June 15, 1878.

*To all whom it may concern:*

Be it known that I, EDWIN JARRELL, of Thorntown, in the county of Boone and State of Indiana, have invented a new and valuable Improvement in Adjustable Plow-Colters; and I do hereby declare that the following is a full, clear, and exact description of the construction and operation of the same, reference being had to the annexed drawings, making a part of this specification, and to the letters and figures of reference marked thereon.

Figure 1 of the drawings is a representation of a perspective view of my adjustable plow-colter, and Fig. 2 is a perspective view of the colter-blade.

The object of my invention is to pulverize the soil by twice turning the same, to cut the sod and turn it by the colter, to clear weeds and stubble away from the track of the standard by throwing it over on the furrow to be turned under by the mold-board of the plow, to diminish friction upon the land-side by cutting a supplemental furrow on the land-side, turning over the soil and leaving a shallow concave furrow, into which the plow follows.

My invention consists in a colter of concavo-convex form, having a sharp oval cutting-edge, and adapted to serve the same purposes as a mold-board, said colter being adjustably attached to a plow-beam, and so constructed and arranged that it will cut a furrow and turn the soil beyond the plane of the furrow on the land-side, and throw the dirt, stubble, &c., on the soil which is turned by the following plow.

The shank of the colter has notches upon its rear surface, into which the attaching-bolt of the clamp engages, and a wedge operates between the forward edge of the shank and the clamp. These devices allow the ready adjustment of the colter.

Referring to the drawing, A represents an ordinary plow-beam, and B the standard. C represents a clamp with screw-threads upon the ends, and a nut on each, which holds the clamping-plate C'. D represents the shank of my colter, and it is adjustably secured to the beam of the plow by the clamp C C'. E represents the colter-blade, essentially a small concavo-convex or spoon-shaped mold-board, with a sharp oval cutting-edge, e, constructed in such a manner that it presents such cutting-edge to the ground in a circular dishing form. It projects inward beyond the land-side, and is adapted to cut a furrow upon the land beyond the plane of the land-side and to turn the soil.

In plowing tough sod or clayey ground, where the soil holds together firmly and tenaciously, the turned edge of the last furrow will lap a short distance upon the previous one, and lying thus leaves a rough surface on the plowed land. My invention cuts off the succeeding furrow in such a manner—beveled, as it were—that on being turned this cut-out portion falls down and the furrow lies flat.

In the modification, Fig. 2, the shank is bent so as to throw the colter still farther over on the land-side.

The shank D has slots $d$ along the back edge, which slots rest on a portion of the clamp. A wedge, $f$, is used between the clamp and the forward upper edge, as shown.

I am aware that it is not broadly new to use a mold-board colter to turn a furrow on the land-side toward the plow, and such is not sought to be covered in this application.

What I claim as new, and desire to secure by Letters Patent, is—

The concavo-convex or spoon-shaped colter E, with oval cutting-edge, adapted to turn a shallow furrow on the land-side beyond the plane of the furrow, having adjusting-shank D, provided on its rear edge with notches $d$, combined with the beam A, clamp C C', and wedge $f$, as specified.

In testimony that I claim the above I have hereunto subscribed my name in the presence of two witnesses.

EDWIN JARRELL.

Witnesses:
HENRY C. WILLS,
FRANK W. MAHAN.